(12) United States Patent
Curt et al.

(10) Patent No.: US 11,962,193 B2
(45) Date of Patent: Apr. 16, 2024

(54) ROTOR SYSTEM FOR PERMANENT MAGNET MOTORS POWERING ELECTRIC SUBMERSIBLE PUMPS

(71) Applicant: RLT HOLDINGS, LLC, Missouri City, TX (US)

(72) Inventors: Edward Curt, Houston, TX (US); Kyle Meier, Houston, TX (US); Jerry Yu, Houston, TX (US); Samuel Rodriguez, Houston, TX (US)

(73) Assignee: RLT Holdings, LLC, Stratford, TX (US)

( * ) Notice: Subject to any disclaimer, the term of this patent is extended or adjusted under 35 U.S.C. 154(b) by 624 days.

(21) Appl. No.: 17/022,581

(22) Filed: Sep. 16, 2020

(65) Prior Publication Data
US 2021/0083544 A1    Mar. 18, 2021

Related U.S. Application Data

(60) Provisional application No. 62/901,713, filed on Sep. 17, 2019.

(51) Int. Cl.
| | |
|---|---|
| *H02K 1/278* | (2022.01) |
| *F04B 17/03* | (2006.01) |
| *H02K 1/279* | (2022.01) |
| *H02K 1/27915* | (2022.01) |
| *H02K 5/128* | (2006.01) |
| *H02K 5/132* | (2006.01) |

(52) U.S. Cl.
CPC .............. *H02K 1/278* (2013.01); *F04B 17/03* (2013.01); *H02K 1/27915* (2022.01); *H02K 5/1285* (2013.01); *H02K 5/132* (2013.01); *H02K 1/279* (2022.01)

(58) Field of Classification Search
CPC ........ H02K 1/27; H02K 1/2706; H02K 1/272; H02K 1/274; H02K 1/2753; H02K 1/278; H02K 1/2781; H02K 1/2783; H02K 1/27915; H02K 5/128; H02K 5/1285; H02K 5/132; H02K 1/279; F04B 17/03; F04B 47/06
See application file for complete search history.

(56) References Cited

U.S. PATENT DOCUMENTS

| | | | | |
|---|---|---|---|---|
| 7,148,598 B2* | 12/2006 | Ionel | ...................... | H02K 15/03 310/156.55 |
| 2013/0147301 A1* | 6/2013 | Li | ........................... | H02K 1/27 310/156.12 |
| 2015/0061444 A1* | 3/2015 | Kamiya | ................. | H02K 1/278 310/156.12 |
| 2018/0363660 A1* | 12/2018 | Klahn | .................... | H02K 1/278 |

* cited by examiner

*Primary Examiner* — Tulsidas C Patel
*Assistant Examiner* — Joshua Kiel M Rodriguez
(74) *Attorney, Agent, or Firm* — Frank E. Reid

(57) ABSTRACT

Embodiments disclosed herein describe methods for improved permanent magnet motor rotor systems for submersible electric motors. The improved rotor system includes a single piece of material shaft with surface mounted permanent magnets. The single piece of material shaft minimizes the number of shaft bearings and locates the bearings outside of the stator windings.

16 Claims, 4 Drawing Sheets

ROTOR SYSTEM FOR PERMANENT MAGNET MOTORS POWERING ELECTRIC SUBMERSIBLE PUMPS

BACKGROUND INFORMATION

Field of the Disclosure

Examples of the present disclosure relate to systems and methods for permanent magnet motors powering pumps. More specifically, embodiments relate to a rotor system including permanent magnets, wherein locations for the permanent magnets are located onto the outer diameter of a single piece shaft.

Background

Hydraulic fracturing is the process of creating cracks or fractures in underground geological formations. After creating the cracks or fractures, a mixture of water, sand, and other chemical additives are pumped into the cracks or fractures to protect the integrity of the geological formation and enhance production of the natural resources. The cracks or fractures are opened by the mixture, allowing the natural resources within the geological formation to flow into a wellbore, and then it is collected at the surface.

Artificial lift is a process utilized to increase the pressure within the wellbore to move the natural resources within the geological formation to the surface. When the natural drive energy of the reservoir is not strong enough to push the oil to the surface, artificial lift is employed to recover more of the natural resources at the surface.

Conventionally, to create artificial lift systems, a centrifugal pump is positioned below an isolate zone, wherein the centrifugal pump is connected to a long electric motor. Due to the geometric constraints of the downhole environment, systems utilize multiple tandem induction motors. Legacy motor construction uses a two-piece construction of the rotor and shaft combination. The shaft in a legacy motor construction is a continuous length rod which is keyed to a multitude of rotors that are slid over with bearings spaced between adjacent rotors. Thus, the continuous length shaft is the only torsional member providing stiffness to the rotating assembly and locates bearings within the stator which contains the motor stator copper windings. Other conventional systems utilize permanent magnet motors instead of induction motors due to improved electrical efficiency, flat operating torque curves, and lower operating temperatures. However, current downhole permanent magnet motors employ the same construction as the legacy induction motors. Since permanent magnet motors rely on the exact alignment of the magnetic field of the rotor to stator, a limitation due to elastic deflection of the long shaft prevents attainment of very high output power.

Furthermore, to couple the magnets on shafts, conventionally a multitude of laminations are stacked, and then the magnets are pressed into slots created by the lamination stack. This lamination stack and magnet composite offers no torsion rigidity to the motors, and thus limits the power output of the motors.

Accordingly, needs exist for systems and methods for a more rigid rotor system to achieve significant increases in permanent magnet motor output. In addition, needs exist to remove the rotor bearings outside of the stator copper windings to minimize additional heating to the stator copper windings.

SUMMARY

Embodiments disclosed herein describe systems and methods for a rotor system with a single piece rotor shaft with machined depressions that are configured to locate permanent magnets, wherein the permanent magnets are positioned between bearings. The rotor system may include a shaft, upper bearings, lower bearings, milled depressions, and permanent magnets.

The shaft may be unitary piece of material forming a rotor that is a moving component of the permanent magnet rotor system. The shaft may have a proximal end that extends past the upper bearings, and a distal end that extends past the lower bearings to allow an attachment of a load or additional rotor systems in series. By coupling a plurality of rotor systems in series, torque across the multiple rotors may be transferred to each other.

The upper bearings may be positioned between a proximal end of the rotor or stator copper windings and a proximal end of the shaft. The upper bearings may be configured to reduce rotational friction while supporting radial and axial loads. The lower bearings may be positioned between a distal end of the rotor or stator copper windings and a distal end of the shaft. The lower bearings may be configured to reduce rotational friction while supporting radial and axial loads. The positioning the bearings between the ends of the shaft and the ends of the stator copper windings allow for the bearings to be positioned in a lower temperature environment.

The depressions may be positioned on an outer circumference of the shaft and extend towards a central axis of the shaft. As such, the depressions may reduce a diameter across the shaft at locations that correspond with the depressions. In embodiments, the depressions may be positioned between the upper bearings and lower bearings.

The permanent magnets may be materials where a magnetic field is generated by the internal structure of the material itself. The permanent magnets may include north magnet stacks and south magnet stacks, with the same or different number of north magnet and south magnet stacks. In embodiments, the permanent magnets may have a shape that corresponds with a shape of the depressions, such that the permanent magnets may be surface mounted within the depressions. When the permanent magnets are positioned within the depressions, the outer circumferences of the permanent magnets may correspond to the outer circumference of the shaft without the depressions to form a uniform outer circumference. The positioning of the permanent magnets allows the rotor system to locate the magnets between the bearings to increase the power density, performance, torque, and torsional rigidity of the system.

Furthermore, by embedding the permanent magnets onto depressions of the shaft, the outer diameter of the shaft and the magnets may be positioned adjacent to a lamination including the stator copper windings, wherein the inner diameter of the lamination may correspond to the outer diameter of the shaft and permanent magnets. This may maximize the cross-sectional area of the rotor, which is stressed in operation.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
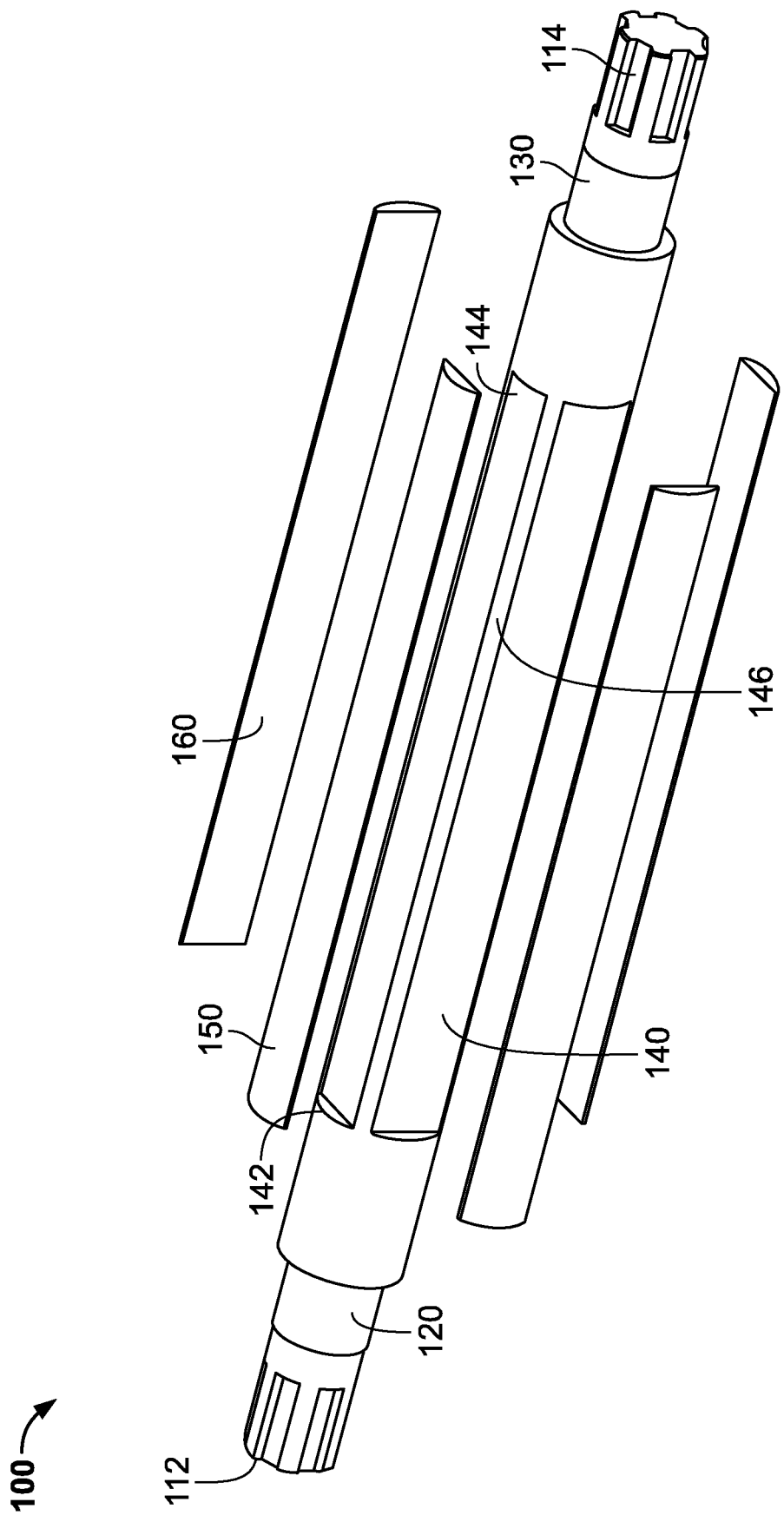
FIG. 1 depicts a permanent magnet motor rotor system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

FIG. 1 depicts a permanent magnet motor rotor system 100, according to an embodiment. Permanent magnet motor rotor system 100 may include a shaft 110, upper bearings location 120, lower bearings location 130, depressions 140, and permanent magnets of a first polarity 150 and of a second polarity 160.

Shaft 110 may be a rotor that is a moving component of permanent magnet rotor system 100. Shaft 110 may include a proximal end 112 that extends past upper bearings location 120, and a distal end 114 that extends past lower bearings location 130. Proximal end 112 and distal end 114 may be configured to allow an attachment of a load or additional permanent magnet rotor systems 100 in series. By coupling a plurality of permanent magnet rotor systems 100 in series, torque across the multiple systems may be transferred to each other, such that the power of the plurality of permanent magnet rotor systems 100 may be customized and amplified.

Upper bearings location 120 may be positioned between proximal end 112 of shaft 110 and a first end 142 of depressions 140. Upper bearings location 120 may be a location where upper bearings are positioned, wherein the upper bearings are configured to reduce rotational friction while supporting radial and axial loads. Lower bearings location 130 may be positioned between a second end 144 of depressions 140 and distal end 114 of shaft 110. Lower bearings location 130 may be a location where lower bearings are positioned, wherein the lower bearings are configured to reduce rotational friction while supporting radial and axial loads. The positioning the bearings between the ends 112, 114 of the shaft 110 and the ends 142, 144 of the depressions 140 allow for the bearings to be positioned in a lower temperature environment. Furthermore, the location of the bearings outside of permanent magnets 150, 160 allow for no bearings to be positioned inside of the stator, and the bearings to be positioned outside of all the stator copper windings.

Depressions 140 may be grooves, indentations, machined depressions, millings, etc. positioned on an outer circumference of shaft 110, at a location between upper bearings 120 and lower bearings 130. Depressions 140 may extend from the outer circumference of shaft 110 and extend towards a central axis of shaft 110, wherein depressions 140 decrease a diameter across shaft 110 at locations that correspond with depressions 140. The depressions 140 allow for more magnet material to be placed within shaft 110. Shaft 110 may include a plurality of depressions 140, which may include any number of depressions 140. In embodiments, the depressions 140 may be spaced apart by channels 146, which may have a shorter width than that of depressions 140.

Permanent magnets 150, 160 may be materials where a magnetic field is generated by the internal structure of the material itself. Permanent magnets 150, 160 may include north magnet stacks 150 and south magnet stacks 160, with the same or different number of north magnet stacks 150 and south magnet stacks 160. In embodiments, the permanent magnets 150, 160 may have a shape that corresponds with a shape of depressions 140, such that the permanent magnets 150, 160 may be surface mounted within the depressions 140. When permanent magnets 150, 160 are positioned within depressions 140, the outer circumferences of the permanent magnets 150, 160 may correspond to the outer circumference of channels 146 to form uniform outer circumference. The positioning of the permanent magnets 150, 160 allows the permanent magnet rotor system 100 to locate the permanent magnets 150, 160 between the bearings to increase the power density, performance, torque, and torsional rigidity of permanent magnet rotor system 100.

Figure 2:
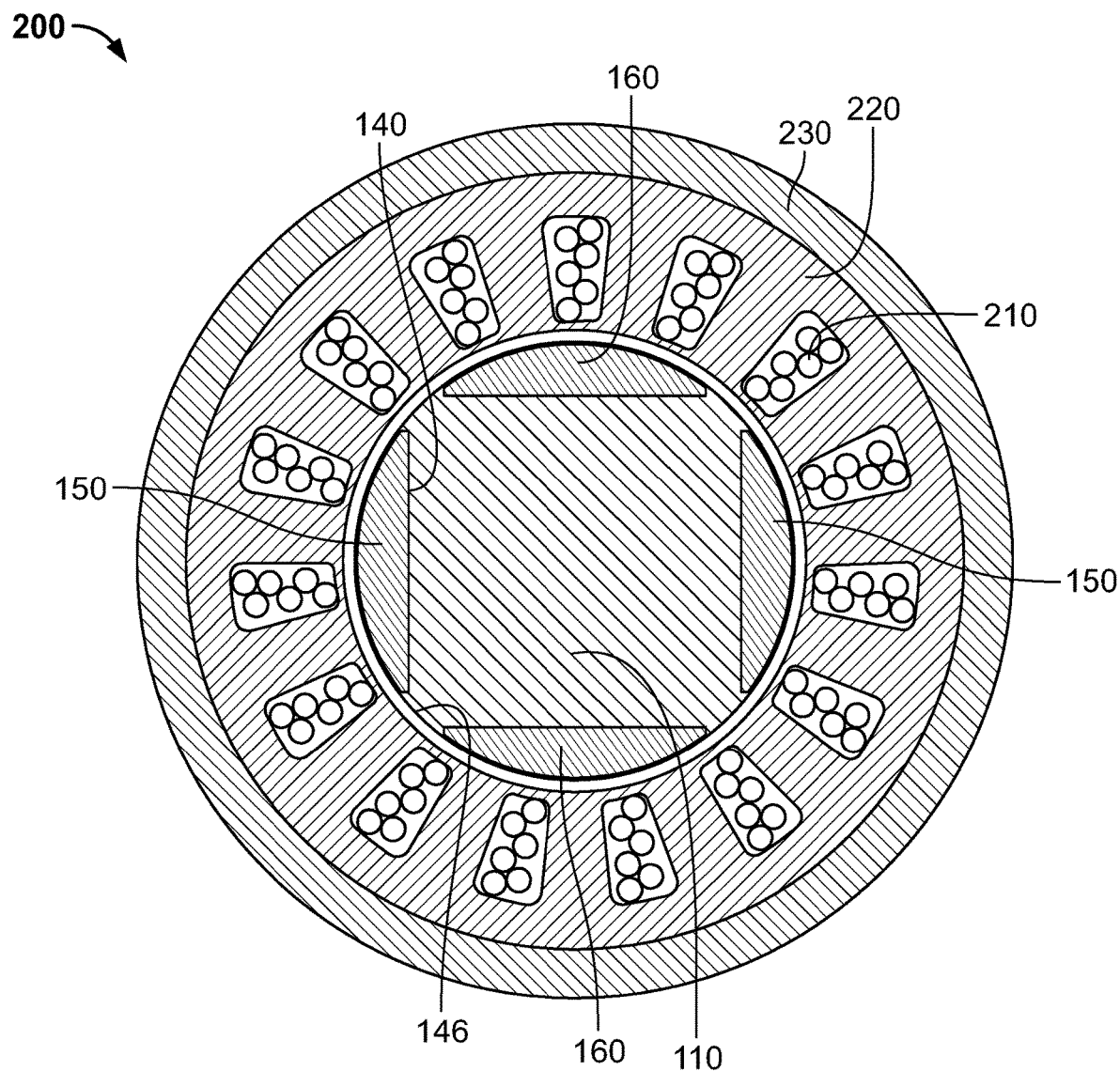
FIG. 2 depicts a horizontal cross section of permanent magnet motor system, according to an embodiment.

FIG. 2 depicts a horizontal cross section of a permanent magnet motor system 200, according to an embodiment. Elements depicted in FIG. 2 may be described above, and for the sake of brevity a further description of these elements is omitted.

As depicted in FIG. 2, shaft 110 may include a plurality of north stack permanent magnets 150 and south stack permanent magnets 160 positioned in depressions 140. A plurality of stator copper windings 210 may be positioned in stacked laminations 220, which encompasses shaft 110. Stacked laminations 220 may be encompassed by a housing 230 that is configured to be coupled to a head and base of the permanent magnet motor system 200.

Because permanent magnets 150, 160 are embedded within machined depressions, the diameter of shaft 110 can be sufficiently equal and maximized at all locations. In other words, the outer diameter of shaft 110 is slightly smaller than the inner diameter of laminations, while an annulus or air gap between laminations 220 and the outer diameter of shaft 110 is substantially constant.

Figure 3:
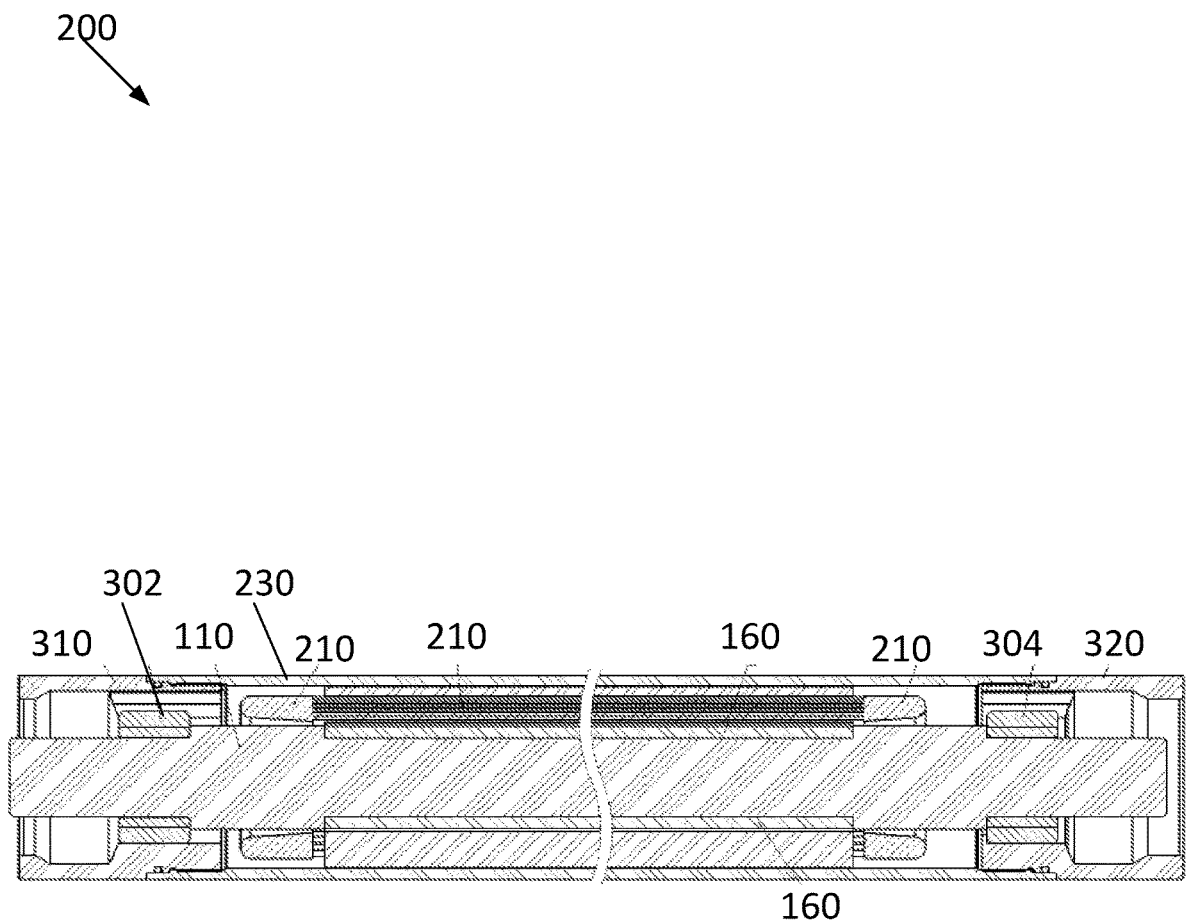
FIG. 3 depicts a longitudinal cross section of a permanent magnet motor system, according to an embodiment.

FIG. 3 depicts a longitudinal cross section of permanent magnet motor system 200, according to an embodiment. Elements depicted in FIG. 3 may be described above, and for the sake of brevity a further description of these elements is omitted.

As depicted in FIG. 3, upper bearings 302 and lower bearings 304 are positioned outside of the stator copper windings 210. This may allow upper bearings and lower bearings 130 to be positioned within a lower temperature environment than within the stator.

As further shown in FIG. 3, housing 230 may be coupled to a head 310 and base 320 of the permanent magnet motor system 200.

Figure 4:
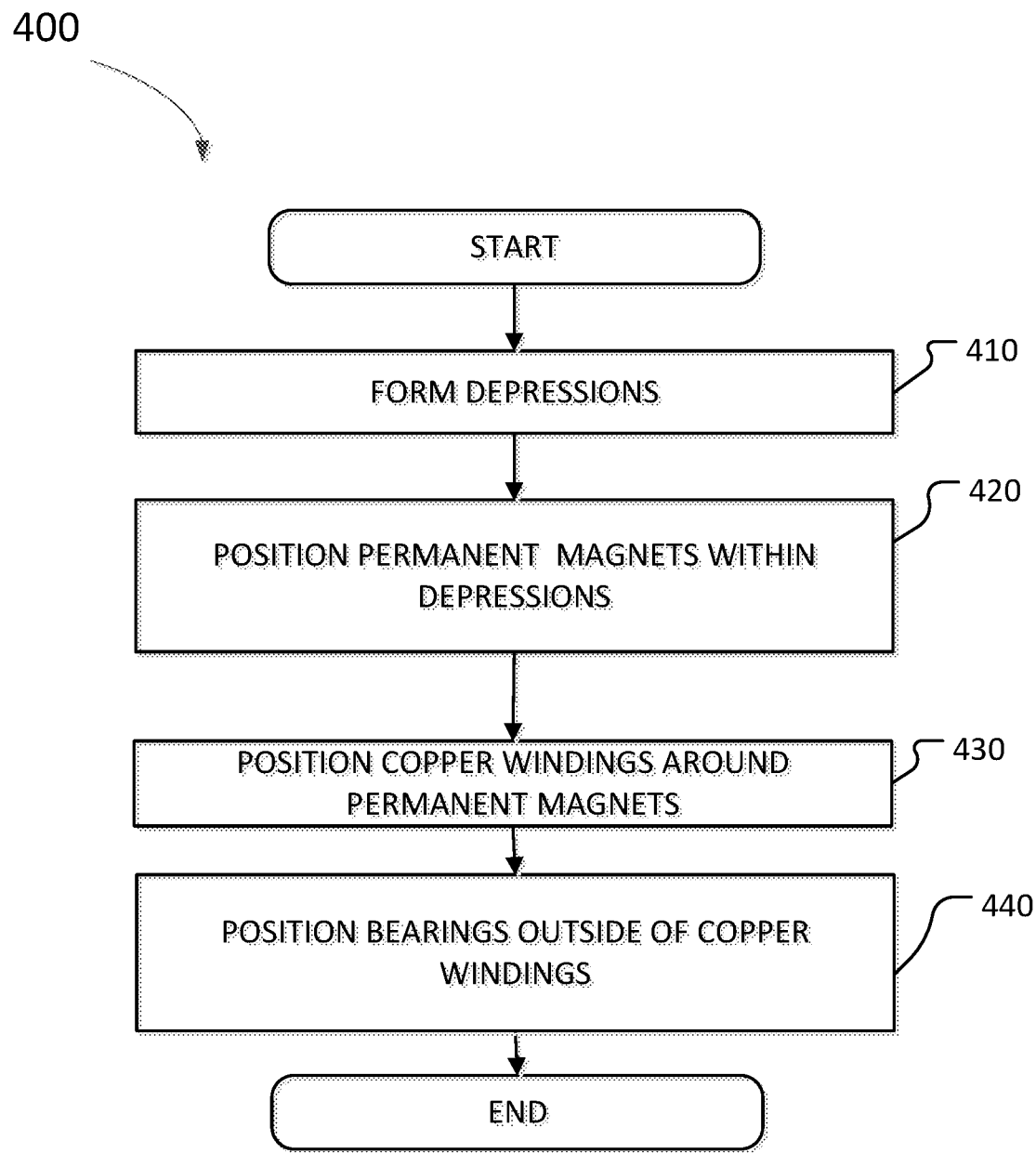
FIG. 4 depicts a method for forming a permanent magnet motor, according to an embodiment.

FIG. 4 depicts a method 400 for forming a permanent magnet motor system 200, according to an embodiment. The operations of the method presented below are intended to be illustrative. In some embodiments, the method may be accomplished with one or more additional operations not described, and/or without one or more of the operations discussed. Additionally, the order in which the operations of the method are illustrated in FIG. 4 and described below is not intended to be limiting.

At operation 410, a plurality of depressions may be machined out of the outer diameter of a shaft towards a central axis of the shaft. In embodiments, a plurality of channels may be formed between the plurality of depressions, wherein the channels have a larger diameter than that of the plurality of depressions.

At operation 420, a plurality of permanent magnets may be positioned into the milled depressions. The plurality of permanent magnets may be shaped such that the circumference of the shaft is substantially constant between locations with permanent magnets and channels formed between the machined depressions.

At operation 430, stator copper windings and stacked laminations may be positioned around the machined depressions embedded with the permanent magnets.

At operation 440, upper and lower bearings may be positioned outside of the stator copper windings.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A permanent magnet motor rotor system comprising:
   a shaft with depressions, the depressions extending from an outer circumference of the shaft towards a central axis of the shaft, wherein the shaft is a single piece of material with a proximal end and a distal end; and
   a plurality of permanent magnets positioned within the depressions, wherein each of the plurality of permanent magnets have a shape that corresponds to the shape of each of the depressions.

2. The permanent magnet motor rotor system of claim 1, further comprising:
   upper bearings positioned between a first end of the depressions and a proximal end of the shaft; and
   lower bearings positioned between a second end of the depressions and a distal end of the shaft;
   wherein the upper bearings and the lower bearings are positioned outside of stator windings.

3. The permanent magnet motor rotor system of claim 1, further including:
   a channel positioned between depressions, a first diameter associated with the channel is substantially the same as a second diameter across a first of the plurality of permanent magnets and a second of the plurality of permanent magnets.

4. The permanent magnet motor rotor system of claim 3, wherein an outer surface of the plurality of permanent magnets is positioned concentrically to an outer surface of the channel.

5. The permanent magnet motor rotor system of claim 1, wherein a cross sectional area of the shaft with the plurality of permanent magnets is maximized by embedding the plurality of permanent magnets within the depressions.

6. The permanent magnet motor rotor system of claim 1, further comprising:
   a stator, wherein the outer circumference of the shaft and the plurality of magnets is positioned adjacent to an inner circumference of the stator.

7. The permanent magnet motor system of claim 6, wherein an air gap between the inner circumference of the stator and the outer circumference of the shaft maintains a same distance.

8. The permanent magnet motor system of claim 1, wherein outer surfaces of the plurality of magnets do not extend past a radial plane associated with the outer circumference of the shaft.

9. A method associated with a permanent magnet motor system comprising:
   forming depressions within a shaft, the depressions extending from an outer circumference of the shaft towards a central axis of the shaft, wherein the shaft is a single piece of material with a proximal end and a distal end; and
   positioning a plurality of permanent magnets within the depressions, wherein each of the plurality of permanent magnets have a shape that corresponds to the shape of each of the depressions.

10. The method of claim 9, further comprising:
    positioning upper bearings between a first end of the depressions and a proximal end of the shaft; and
    positioning lower bearings between a second end of the depressions and a distal end of the shaft;
    wherein the upper bearings and the lower bearings are positioned outside of stator windings.

11. The method of claim 9, further including:
    forming a channel positioned between depressions, a first diameter associated with the channel is substantially the same as a second diameter across a first of the plurality of permanent magnets and a second of the plurality of permanent magnets.

12. The method of claim 11, wherein an outer surface of the plurality of permanent magnets is positioned concentrically to an outer surface of the channel.

13. The method of claim 9, wherein a cross sectional area of the shaft with the plurality of permanent magnets is maximized by embedding the plurality of permanent magnets within the depressions.

14. The method of claim 9, wherein the outer circumference of the shaft and the plurality of magnets is positioned adjacent to an inner circumference of a stator.

15. The method of claim 14, wherein an air gap between the inner circumference of the stator and the outer circumference of the shaft maintains a same distance.

16. The method of claim 9, wherein outer surfaces of the plurality of magnets do not extend past a radial plane associated with the outer circumference of the shaft.

\* \* \* \* \*